US012679397B2

(12) United States Patent
Lee et al.

(10) Patent No.: US 12,679,397 B2
(45) Date of Patent: Jul. 14, 2026

(54) METHOD AND APPARATUS FOR DRIVER INTENT PREDICTION

(71) Applicants: Hyundai Motor Company, Seoul (KR); Kia Corporation, Seoul (KR)

(72) Inventors: Sung Wook Lee, Seoul (KR); Jae Kyun Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 18/644,390

(22) Filed: Apr. 24, 2024

(65) Prior Publication Data

US 2025/0128721 A1      Apr. 24, 2025

(30) Foreign Application Priority Data

Oct. 20, 2023      (KR) ......................... 10-2023-0141272

(51) Int. Cl.
| | |
|---|---|
| *B60W 50/00* | (2006.01) |
| *B60W 50/10* | (2012.01) |
| *G06N 3/00* | (2023.01) |
| *G06N 3/0464* | (2023.01) |

(52) U.S. Cl.
CPC ........ *B60W 50/10* (2013.01); *B60W 50/0097* (2013.01); *G06N 3/0464* (2023.01); *B60W 2552/53* (2020.02); *B60W 2555/60* (2020.02)

(58) Field of Classification Search
CPC ............. B60W 50/10; B60W 50/0097; B60W 2552/53; B60W 2555/60; G06N 3/0464

USPC ............................................................ 701/1
See application file for complete search history.

(56) References Cited

U.S. PATENT DOCUMENTS

| | | | |
|---|---|---|---|
| 2020/0160068 A1* | 5/2020 | Silver ................... | G06F 18/217 |
| 2021/0001877 A1* | 1/2021 | Han ....................... | B60W 40/02 |
| 2022/0349725 A1* | 11/2022 | Chreptyk ............... | G01C 21/32 |
| 2023/0144209 A1* | 5/2023 | Cai ....................... | G06N 3/0464 |

OTHER PUBLICATIONS

Jie Wang, Jiye Liang, Kaixuan Yao, Jianqing Liang, Dianhui Wang, "Graph convolutional autoencoders with co-learning of graph structure and node attributes, " Aug. 10, 2021, Elsevier, Science Direct, Whole Article. (Year: 2021).*

* cited by examiner

*Primary Examiner* — Tiffany P Young
(74) *Attorney, Agent, or Firm* — Slater Matsil, LLP

(57) ABSTRACT

An embodiment method performed by a driver intent prediction apparatus for predicting a driver intent of a driver includes receiving driving environment information including lane information and trajectory information, receiving driving information, outputting a lane feature vector by inputting the lane information into a first encoder, outputting a trajectory feature vector by inputting the trajectory information into a second encoder, and predicting the driver intent by inputting a plurality of feature vectors into a driver intent prediction model.

20 Claims, 6 Drawing Sheets

METHOD AND APPARATUS FOR DRIVER INTENT PREDICTION

CROSS-REFERENCE TO RELATED APPLICATIONS

This application claims the benefit of Korean Patent Application No. 10-2023-0141272, filed on Oct. 20, 2023, which application is hereby incorporated herein by reference in its entirety.

TECHNICAL FIELD

The present disclosure relates to a method and an apparatus for driver intent prediction.

BACKGROUND

The description in this section merely provides background information related to embodiments of the present disclosure and does not necessarily constitute already known prior art.

An autonomous vehicle aims to navigate to the vehicle's destination without driver intervention. Autonomous vehicles in level 4 and lower levels require driver intervention, and in situations where a driver takes the wheel, the driver intent needs to be predicted for the sake of driving safety control.

Conventional methods were able to grasp only limited driver intents such as turning, going straight, changing lanes, and maintaining lanes of a vehicle based on information such as vehicle speed, steering angle, and yaw rate. They have difficulty determining complex driver intents such as sudden lane changes, joining a lane, and biased driving within a lane.

The driver intent has a causal relationship with the lane network such as crossroads, traffic signals, and past driving trajectories. However, no conventional method takes these into account. Therefore, to accurately predict driver intents, a driver intent determination method considering the lane network, traffic signals, and past driving trajectory is needed.

In addition, conventional methods of determining driver intent using artificial intelligence proposed methods of predicting the destination coordinates of the vehicle to predict the future route, but the prediction results may be unstable due to inputs not considered during artificial intelligence training. Thus, there is a need for a driver intent determination method using a stable model.

SUMMARY

The present disclosure relates to a method and an apparatus for driver intent prediction. Particular embodiments relate to a method and an apparatus for predicting driver intent by using a grid map.

Embodiments of the present disclosure provide a reliable driver intent prediction model and a training method thereof that can accurately predict complex driver intents.

The embodiments of the present disclosure are not limited to those mentioned above, and other embodiments not mentioned herein will be clearly understood by those skilled in the art from the following description.

At least one embodiment of the present disclosure provides a method performed by a driver intent prediction apparatus for predicting a driver intent of a driver, including receiving driving environment information including lane information and trajectory information and receiving driving information, outputting a lane feature vector by inputting the lane information into a first encoder, outputting a trajectory feature vector by inputting the trajectory information into a second encoder, and predicting the driver intent by inputting a plurality of feature vectors into a driver intent prediction model.

Another embodiment of the present disclosure provides a driver intent prediction apparatus including an input unit configured to receive driving environment information including lane information and trajectory information and to receive driving information, a feature extraction unit configured to output a lane feature vector upon receiving the lane information and to output a trajectory feature vector upon receiving the trajectory information, and a driver intent prediction unit configured to predict a driver intent by inputting a plurality of feature vectors into a driver intent prediction model.

Embodiments of the aforementioned method and apparatus may include one or more of the following features.

Embodiments may include training the driver intent prediction model by using the driver intent and the trajectory information.

The outputting of the lane feature vector includes normalizing the lane information by removing noise from the lane information and representing the denoised lane information as a graph and inputting the normalized lane information into the first encoder.

The outputting of the trajectory feature vector includes normalizing the trajectory information by removing noise from the trajectory information and representing the denoised trajectory information as a graph and inputting the normalized trajectory information into the second encoder.

The first encoder and the second encoder may each include a graph convolutional network (GCN).

Embodiments may further include generating a grid map by using the driving information and the lane information, wherein the driver intent is represented as a destination on the grid map.

According to the embodiments of the present disclosure, it may be possible to predict a complex driver intent by predicting the destination of a vehicle using a grid map.

According to the embodiments of the present disclosure, it may be possible to accurately predict driver intent by using lane information, trajectory information, and traffic signal information.

According to the embodiments of the present disclosure, it may be possible to provide a method of training a reliable driver intent prediction model by predicting driver intent within a limited grid map.

The effects of embodiments of the present disclosure are not limited to those mentioned above, and other unmentioned effects will be clearly understood by those skilled in the art from the following description.

DETAILED DESCRIPTION OF ILLUSTRATIVE EMBODIMENTS

Figure 1:
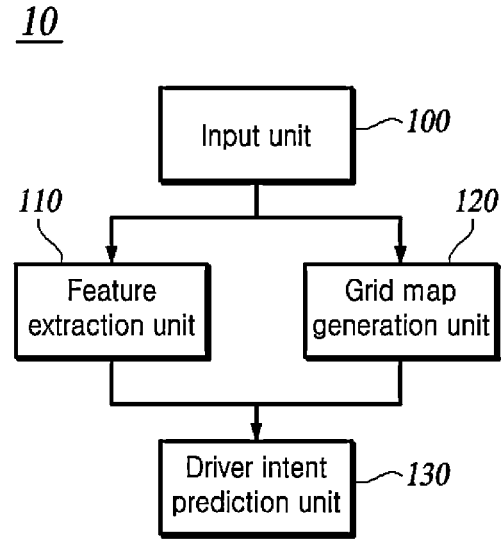
FIG. 1 is a schematic block diagram of a driver intent prediction apparatus according to at least one embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of embodiments of the present disclosure will be omitted for the purpose of clarity and for brevity.

Various ordinal numbers or alpha codes such as first, second, i), ii), a), b), etc. are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of embodiments of the present disclosure to be presented below in conjunction with the accompanying drawings is intended to describe exemplary embodiments of the present disclosure and is not intended to represent the only embodiments in which the technical idea of the embodiments of the present disclosure may be practiced.

FIG. 1 is a schematic block diagram of a driver intent prediction apparatus according to at least one embodiment of the present disclosure. The components illustrated in FIG. 1 represent functionally distinct elements, and at least one of the components may be implemented to be integrated with the others in a real physical environment.

Referring to FIG. 1, a driver intent prediction apparatus 10 includes all or part of an input unit 100, a feature extraction unit 110, a grid map generation unit 120, and a driver intent prediction unit 130.

The driver intent prediction apparatus 10, according to at least one embodiment of the present disclosure, may use a coordinate system to represent the locations of objects and elements in the environment. For example, the driver intent prediction apparatus 10 may represent the locations of surrounding objects and elements by using a coordinate system with the current location of the vehicle as an origin. The driver intent prediction apparatus 10 may represent the locations of surrounding objects and elements by using a coordinate system with the current driving direction of the vehicle as the x-direction and the width direction of the vehicle as the y-direction.

The input unit 100 receives the driving information of the vehicle. Here, the driving information of the vehicle includes at least one of an acceleration of the vehicle, a yaw rate of the vehicle, a steering angle of the vehicle, a speed of the vehicle, input values of an accelerator pedal and a brake pedal, or any combination thereof. In one example, the input unit 100 may receive driving information from a sensor unit (not shown). In another example, the input unit 100 may receive the driving information of the vehicle from storage.

The input unit 100 receives the driving environment information of the vehicle. Here, the driving environment information includes at least one of a high-definition map, trajectory information, traffic signal information, the current location of the vehicle, or any combination thereof. A high-definition map may include lane information, crossroad information, etc. The lane information may include information on a lane center point, a lane centerline, and a width of a lane. In one example, the input unit 100 may receive the driving environment information from a server. In another example, the input unit 100 may receive the driving environment information from the storage.

The feature extraction unit 110 pre-processes the driving information and driving environment information received by the input unit 100 and encodes the pre-processed information to extract feature vectors.

Figure 2:
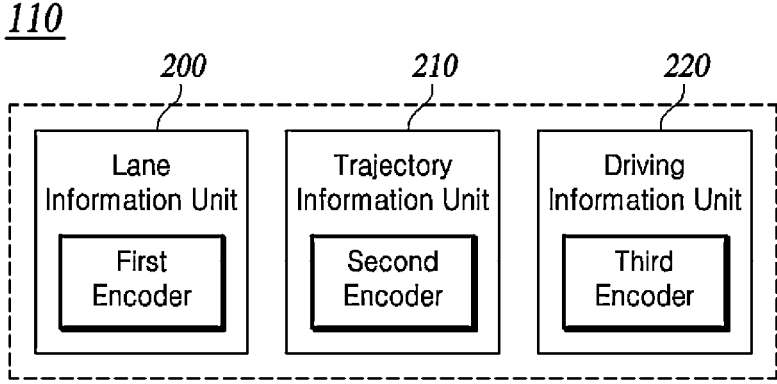
FIG. 2 is a schematic block diagram of a feature extraction unit according to at least one embodiment of the present disclosure.
Figure 3:
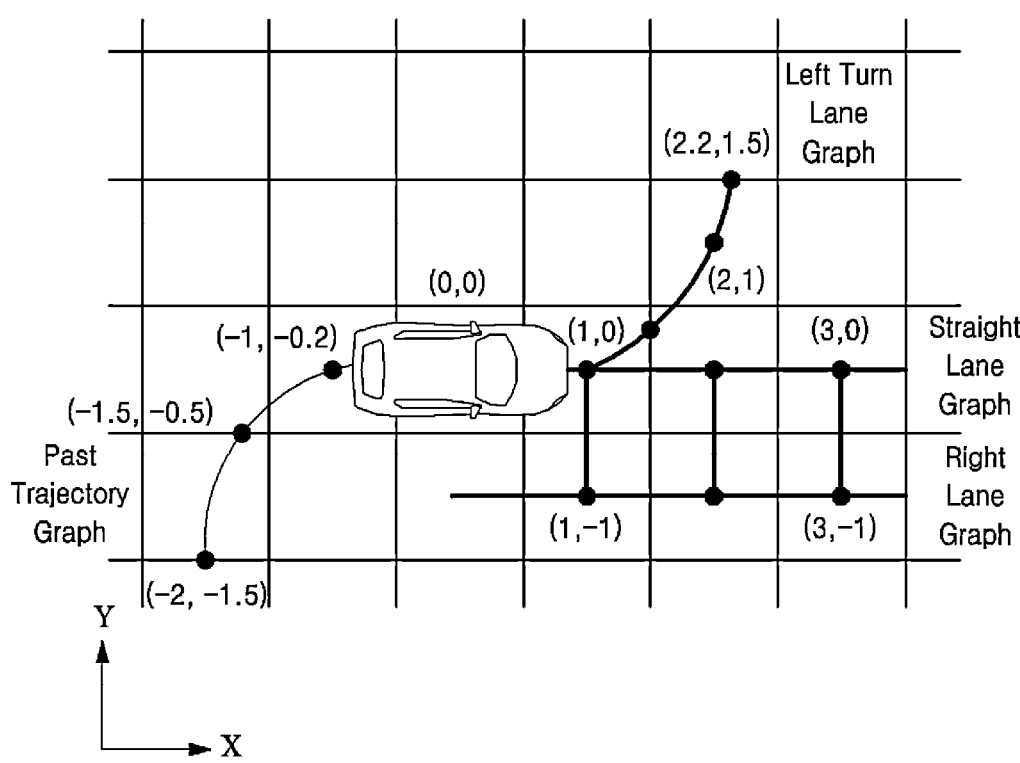
FIG. 3 is a diagram illustrating lane information and trajectory information according to at least one embodiment of the present disclosure.

The following describes the feature extraction unit 110 with reference to FIGS. 2 and 3.

FIG. 2 is a schematic block diagram of the feature extraction unit 110 according to at least one embodiment of the present disclosure. The components illustrated in FIG. 2 represent functionally distinct elements, and at least one of the components may be implemented to be integrated with the others in a real physical environment.

FIG. 3 is a diagram illustrating lane information and trajectory information according to at least one embodiment of the present disclosure.

Referring to FIGS. 2 and 3, the feature extraction unit 110 includes all or part of a lane information unit 200, a trajectory information unit 210, and a driving information unit 220.

The lane information unit 200 receives lane information from the input unit 100. The lane information is information on a lane contained in the high-definition map. The lane information may include, for example, information on a lane center point and a lane centerline.

The lane information unit 200 pre-processes the received lane information. The lane information unit 200 may remove noise from the lane information using a moving average filter. The lane information unit 200 may convert coordinates of each point of the lane information into relative coordinates based on the current location of the vehicle and store them as a graph.

The lane information unit 200 may convert coordinates of each point of the denoised lane information into relative coordinates. Here, the relative coordinates may be those in a coordinate system with the current location of the vehicle as an origin. The lane information may be represented by a set of points. For example, if a lane in which the vehicle is currently located is a straight lane, the lane may be represented by a set of coordinates such as (1, 0), (2, 0), and (3, 0). As another example, a left turn lane may be represented by a set of coordinates such as (1, 0.2), (2, 1), and (2.2, 1.5). These coordinates are for illustrative purposes only and are not intended to have significance or to be limiting factors in the present disclosure.

The lane information unit 200 stores the denoised lane information as a graph. One graph represents one lane. For example, a straight lane may be represented by a graph connecting the coordinates of (1, 0), (2, 0), and (3, 0). In another example, a left turn lane may be represented by a graph connecting the coordinates of (1, 0.2), (2, 1), and (2.2, 1.5).

The lane information unit 200 inputs the pre-processed lane information to a first encoder. The first encoder may include a pre-trained artificial neural network. The pre-trained artificial neural network may be trained through machine learning or deep learning. The pre-trained artificial neural network may be, for example, a graph convolutional network (GCN). The lane information unit 200 extracts a feature vector from the lane information by using the first encoder and outputs the feature vector. For example, the lane information unit 200 may extract a one-dimensional feature vector from the lane information and output the same. The feature vector outputted by the lane information unit 200 is referred to as a lane feature vector.

The lane information unit 200 may utilize only lane information within a certain distance from the current location of the vehicle. For example, the lane information unit 200 may use only lane information of three lanes including the current lane of the vehicle to output a one-dimensional feature vector.

The trajectory information unit 210 receives trajectory information from the input unit 100. The trajectory information is information on the past traveling trajectory of the vehicle.

The trajectory information unit 210 pre-processes the received trajectory information. The trajectory information unit 210 may remove noise from the trajectory information using a moving average filter. The trajectory information unit 210 may convert coordinates of each point of the trajectory information into relative coordinates based on the current location of the vehicle and store them as a graph.

The trajectory information unit 210 may convert coordinates of each point of the denoised trajectory information into relative coordinates. Here, the relative coordinates may be those in a coordinate system with the current location of the vehicle as an origin. The trajectory information may be represented by a set of points. For example, if the vehicle had continued straight, a trajectory may be represented by the set of (−3, 0), (−2, 0), and (−1, 0). If the vehicle has turned right to reach the current location, a trajectory may be represented by the set of (−2, −1.5), (−1.5, −0.5), and (−1, −0.2). The foregoing coordinates are for illustrative purposes only and do not imply any significance or limit the disclosure.

The trajectory information unit 210 stores the denoised trajectory information as a graph. One graph represents one trajectory. For example, the trajectory that the vehicle continued to go straight may be represented by a graph connecting the coordinates of (−3, 0), (−2, 0), and (−1, 0). In another example, if the vehicle has made a right turn to reach its current location, the trajectory may be represented by a graph connecting the coordinates of (−2, −1.5), (−1.5, −0.5), and (−1, −0.2). Normally, a vehicle travels along a lane centerline. Thus, according to at least one embodiment of the present disclosure, one graph may be a graph that conforms to the lane centerline.

The trajectory information unit 210 inputs the pre-processed trajectory information to a second encoder. Here, the second encoder may include a pre-trained artificial neural network. The pre-trained artificial neural network may be trained through machine learning or deep learning. The pre-trained neural network may be, for example, a graph convolutional network (GCN). The trajectory information unit 210 extracts a feature vector from the trajectory information by using the second encoder and outputs the feature vector. For example, the trajectory information unit 210 may extract a one-dimensional feature vector from the trajectory information and output the same. The feature vector outputted by the trajectory information unit 210 is referred to as a trajectory feature vector.

The trajectory information unit 210 may utilize only trajectory information within a certain distance from the current location of the vehicle. For example, the trajectory information unit 210 may use only one kilometer of trajectory information to output a one-dimensional feature vector.

The driving information unit 220 receives the driving information of the vehicle from the input unit 100. The driving information unit 220 pre-processes the driving information of the vehicle. Pre-processing is a process for removing noise. Here, the driving information unit 220 may pre-process the driving information of the vehicle by using a low-pass filter (LPF).

The driving information unit 220 inputs the pre-processed driving information to a third encoder. The third encoder may include a pre-trained artificial neural network. Here, the pre-trained artificial neural network may be trained through machine learning or deep learning. The driving information unit 220 extracts a feature vector from the driving information by using the third encoder and outputs the feature vector. For example, the driving information unit 220 may extract a one-dimensional feature vector from the driving information and output the same. The feature vector outputted by the driving information unit 220 is referred to as a driving feature vector.

The grid map generation unit 120 generates a grid map. The following describes the grid map generation unit 120 with reference to FIGS. 4A and 4B.

Figure 4A:
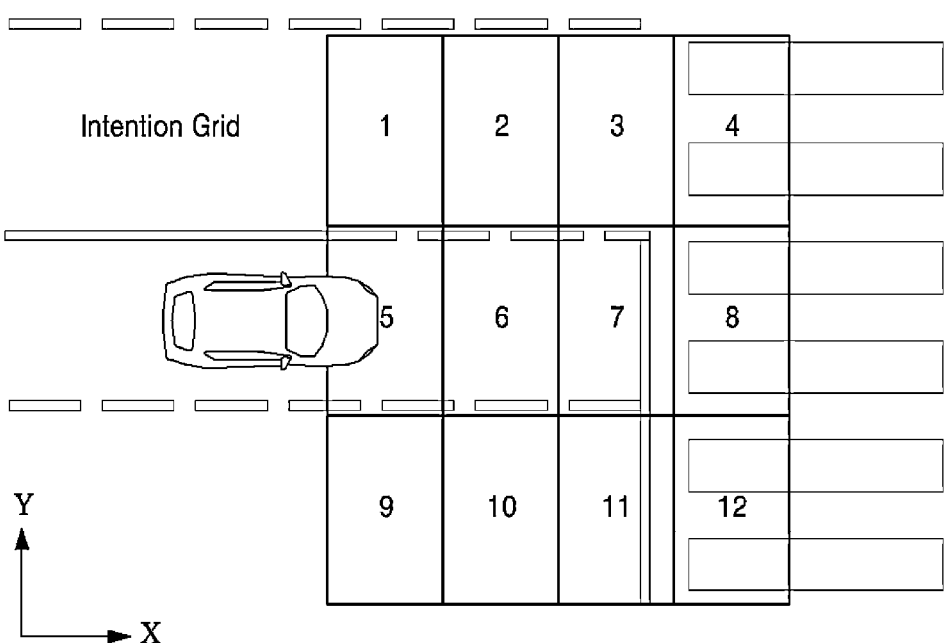
FIGS. 4A and 4B illustrate exemplary grid maps generated by a grid map generation unit according to at least one embodiment of the present disclosure.
Figure 4B:
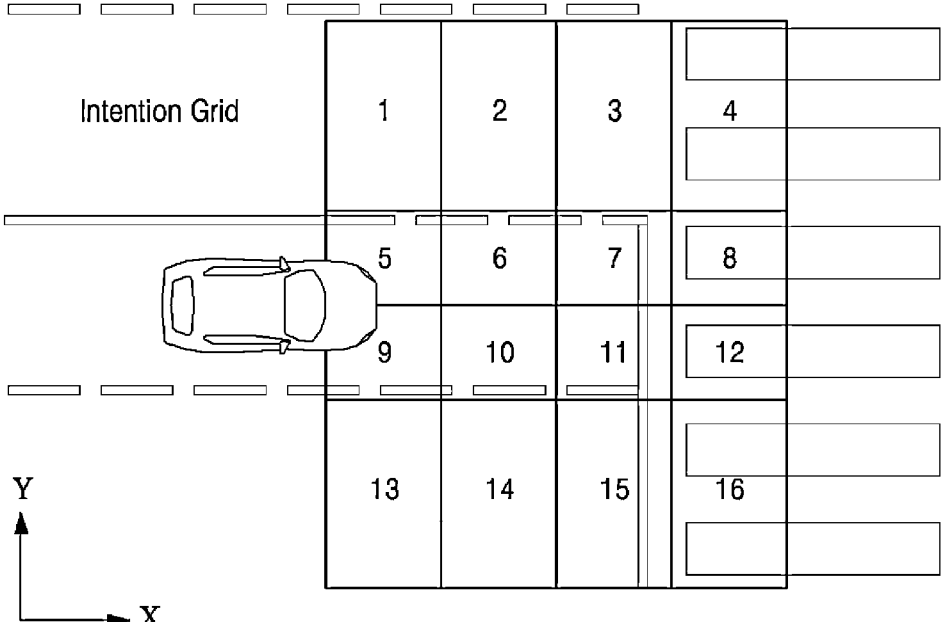

FIGS. 4A and 4B illustrate exemplary grid maps generated by a grid map generation unit according to at least one embodiment of the present disclosure.

The grid map generation unit 120 generates a grid map for a driving available region based on driving information and driving environment information. The grid map generation unit 120 determines an x-directional length of the grid map by using the vehicle's speed and acceleration. The grid map generation unit 120 determines the y-directional length of the grid map by using a width of a driving lane and one or more adjacent lanes. The grid map generation unit 120 generates the grid map by dividing the region into a plurality of grids. Here, the grid map generation unit 120 generates a grid map only for the direction of travel of the vehicle. In other words, the grid map is generated only for the front region of the vehicle.

According to at least one embodiment of the present disclosure, the size of each grid in the grid map may be the same. Referring to FIG. 4A, all grids in the grid map may have the same length in the x-direction and the same length in the y-direction.

According to another embodiment of the present disclosure, the size of each grid in the grid map may be different. Referring to FIG. 4B, the size of each grid in the lane where the vehicle is currently located may be smaller than the size of each grid in another lane. For example, the size of each grid in the vehicle's current lane may be 0.5 times the size of the grid in another lane. In other words, the y-directional length of each grid in the vehicle's current lane may be 0.5 times the y-directional length of the grid in the other lane.

Alternatively, each grid of the grid map may be configured differently from those described above.

The driver intent prediction unit 130 predicts a driver intent. The driver intent prediction unit 130 uses a driver intent prediction model to predict the driver intent. The driver intent prediction model may be pre-trained through machine learning or deep learning. The driver intent prediction model may be, for example, implemented based on a deep neural network (DNN).

The driver intent prediction unit 130 receives the feature vectors from the feature extraction unit 110. The driver intent prediction unit 130 receives traffic signal information from the input unit 100. The feature vectors include at least one of the driving feature vector, the lane feature vector, the trajectory feature vector, or any combination thereof. The driver intent prediction unit 130 may use a plurality of feature vectors and the traffic signal information to predict the driver intent and train the driver intent prediction model.

The driver intent prediction model receives the feature vectors and the traffic signal information as inputs and predicts the driver intent. According to at least one embodiment of the present disclosure, the driver intent predicted by the driver intent prediction model may be represented as a grid area on the grid map.

Figure 5:
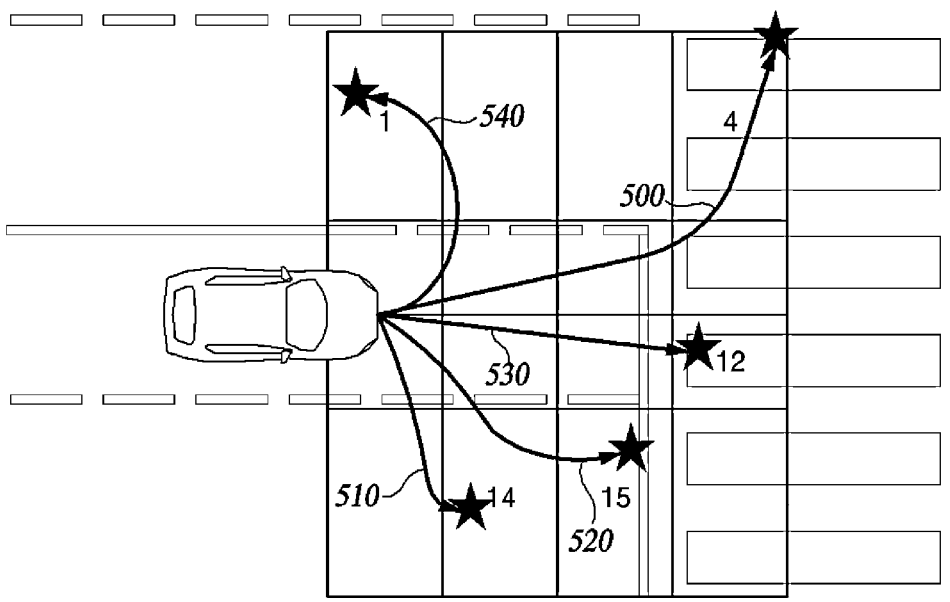
FIG. 5 is a diagram illustrating a driver intent predicted by a driver intent prediction model according to at least one embodiment of the present disclosure on a grid map.

FIG. 5 is a diagram illustrating a grid map depicting driver intents predicted by the driver intent prediction model according to at least one embodiment of the present disclosure.

Referring to FIG. 5, if the predicted driver intent is a left turn, the driver intent prediction model may predict the $4^{th}$ grid area of the grid map to be the destination, as shown at 500. If the predicted driver intent is a sudden lane change, the driver intent prediction model may predict the $14^{th}$ grid area of the grid map to be the destination, as shown at 510. If the predicted driver intent is a slow lane change, the driver intent prediction model may predict the $15^{th}$ grid area of the grid map to be the destination, as shown at 520. If the predicted driver intent is a biased driving in the lane, the driver intent prediction model may predict the $12^{th}$ grid area of the grid map to be the destination, as shown at 530. If the predicted driver intent is a U-turn, then the $1^{st}$ grid area of the grid map may be predicted as the destination, as shown at 540.

While FIGS. 4A and 4B show grid maps as having twelve or sixteen grids, respectively, they are merely for illustrative purposes and are not intended to limit the present disclosure. The grid map may have more than sixteen grids and may have fewer than twelve grids.

The driver intent prediction unit 130 may use the driver intent predicted by the driver intent prediction model to predict a driving route of the vehicle. For example, the driver intent prediction unit 130 may predict the driving route of the vehicle by using the driver intent and a path equation. Namely, the driver intent prediction unit 130 may predict the driving route of the vehicle by using a destination on a grid map and a path equation. The driver intent prediction model may be pre-trained using training data generated from driving history data collected from a plurality of vehicles. The driver intent prediction unit 130 may label the actual driving route of the vehicle and train the driver intent prediction model by using the labeled actual driving route as training data. The actual driving route of the vehicle may be obtained from trajectory information. For example, the actual driving route may be the same as the vehicle's trajectory included in the trajectory information.

Figure 6:
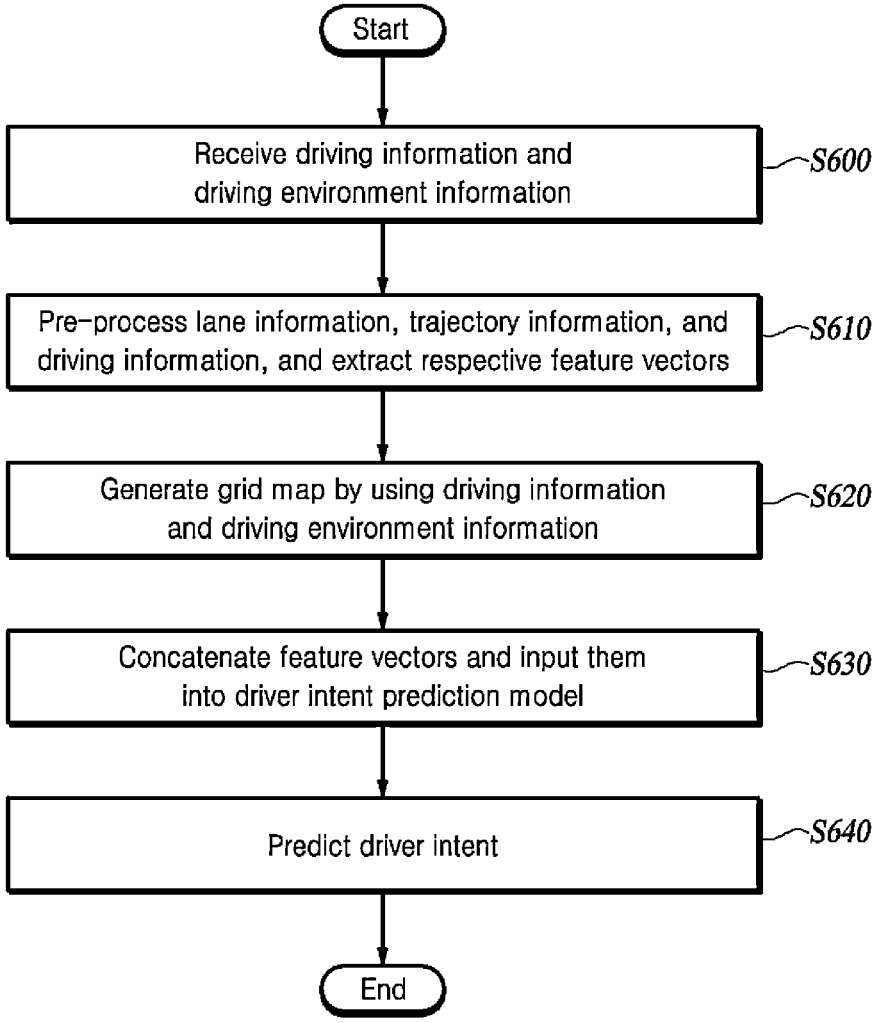
FIG. 6 is a flowchart of a driver intent prediction method according to at least one embodiment of the present disclosure.

FIG. 6 is a flowchart of a driver intent prediction method according to at least one embodiment of the present disclosure.

Referring to FIG. 6, the input unit 100 receives driving information and driving environment information (S600). The driving environment information includes at least one of lane information, trajectory information, traffic signal information, or any combination thereof.

The feature extraction unit 110 pre-processes the lane information, the trajectory information, and the driving information and extracts their respective feature vectors (S610). For example, the feature extraction unit 110 may represent the lane information and the trajectory information from which noise has been removed as graphs. For example, the feature extraction unit 110 may remove noise from the driving information. The feature extraction unit 110 may input the pre-processed lane information to the first encoder to extract a lane feature vector. The feature extraction unit 110 may input the trajectory information to the second encoder to extract a trajectory feature vector. The feature extraction unit 110 may input the pre-processed driving information to the third encoder to extract a driving feature vector.

The grid map generation unit 120 uses the driving information and the driving environment information to generate a grid map (S620). The grid map generation unit 120 may determine a region in which the grid map is to be generated by using the width of lanes, the speed of the vehicle, and the acceleration of the vehicle, and it may generate the grid map by dividing the region in which the grid map is to be generated.

The driver intent prediction unit 130 concatenates the feature vectors. Here, the feature vectors are those extracted from the lane information, the trajectory information, and the driving information. The driver intent prediction unit 130 inputs the concatenated feature vectors into the driver intent prediction model (S630).

The driver intent prediction model predicts the driver intent (S640). The driver intent prediction model may predict the driver intent by determining a particular grid area on the grid map as a destination.

According to at least one embodiment of the present disclosure, the driver intent prediction model may be a model trained by a learning method to be described with reference to FIG. 7.

Figure 7:
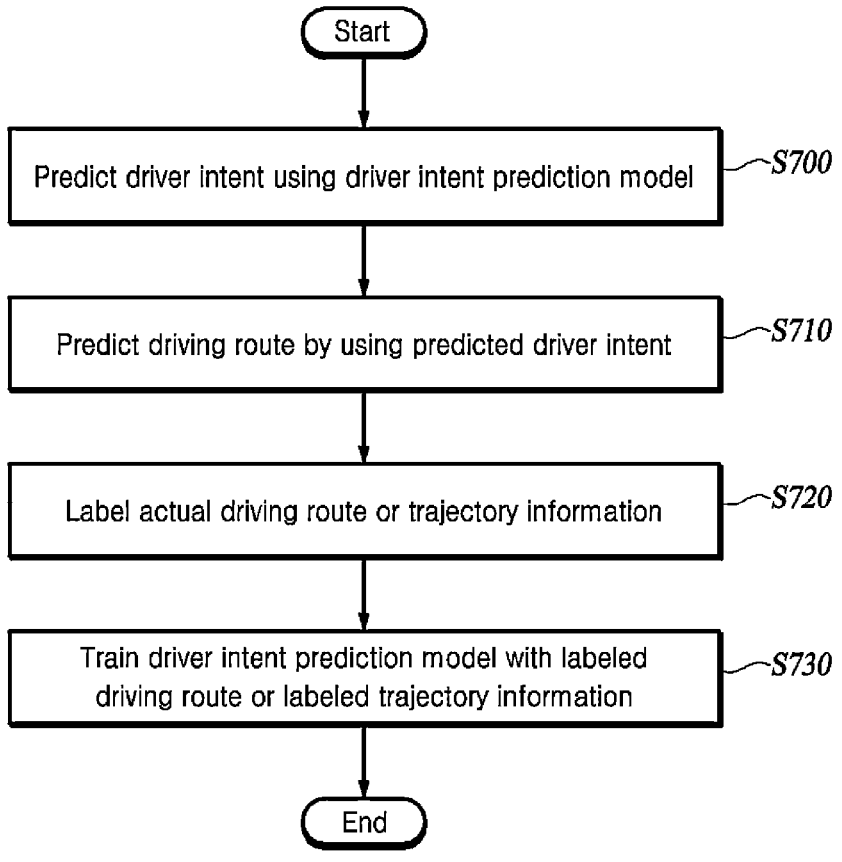
FIG. 7 is a flowchart of a method of training a driver intent prediction model according to at least one embodiment of the present disclosure.

FIG. 7 is a flowchart of a method of training a driver intent prediction model according to at least one embodiment of the present disclosure.

Referring to FIG. 7, the driver intent prediction model predicts a driver intent (S700). The driver intent prediction model may predict the driver intent by determining a particular grid area on the grid map as a destination.

The driver intent prediction model may use a path equation to generate a driving route to the particular grid area determined as the destination (S710). The driver intent prediction model may predict a driving route to the destination by using, for example, a cubic path equation.

The driver intent prediction model may receive an actual driving route. For example, the actual driving route may be obtained from the trajectory information. The driver intent prediction model may label the actual driving route or the trajectory information (S720).

The driver intent prediction model may be trained with the labeled actual driving route or the labeled trajectory information (S730). For example, the driver intent prediction model may be trained by comparing the labeled actual driving route and the predicted driving route and using the comparison results to change the weights of the plurality of layers, respectively.

The apparatus or method according to embodiments of the present disclosure may have the respective components arranged to be implemented as hardware or software or as hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, a CD-ROM, a magnetic tape, a floppy disk, a memory card, a hard disk, an optical/magnetic disk, storage devices, and the like. The computer-readable recording mediums may further include transitory media such as a data transmission medium. Further, the computer-readable recording medium can be distributed in computer systems connected via a network, wherein the computer-readable codes can be stored and executed in a distributed mode.

Although the steps in the respective flowcharts/timing charts are described to be sequentially performed, they merely instantiate the technical idea of some embodiments of the present disclosure. Therefore, a person having ordinary skill in the pertinent art could perform the steps by changing the sequences described in the respective flowcharts/timing charts or by performing two or more of the steps in parallel, and hence the steps in the respective flowcharts/timing charts are not limited to the illustrated chronological sequences.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method for predicting a driver intent of a driver, the method comprising:

receiving driving environment information comprising lane information and trajectory information of a vehicle;

receiving driving information of the vehicle;

generating a lane feature vector by inputting the lane information into a first encoder implemented as a first graph convolutional network;

generating a trajectory feature vector by inputting the trajectory information into a second encoder implemented as a second graph convolutional network;

generating a driving feature vector by inputting the driving information into a third encoder implemented as an artificial neural network; and predicting the driver intent by inputting at least one of the lane feature vector, the trajectory feature vector or the driving feature vector into a driver intent prediction model, wherein the driver intent is represented as a destination grid cell on a grid map corresponding to a drivable region of the vehicle.

2. The method of claim 1, further comprising training the driver intent prediction model by using the driver intent and the trajectory information.

3. The method of claim 2, wherein training the driver intent prediction model comprises:

labeling the trajectory information;

generating a predicted driving route by using the driver intent;

comparing the labeled trajectory information with the predicted driving route; and changing a weight of the driver intent prediction model based on a result of the comparing.

4. The method of claim 1, wherein generating outputting the driving feature vector comprises:

pre-processing the driving information by removing noise from the driving information; and inputting the pre-processed driving information into the third encoder.

5. The method of claim 1, further comprising generating the grid map by using the lane information and the driving information.

6. The method of claim 5, wherein generating the grid map comprises:

determining a size of a region for which the grid map is to be generated by using the driving information and the lane information; and generating the grid map by dividing the region into a plurality of grids.

7. The method of claim 6, wherein generating the grid map by dividing the region into the plurality of grids comprises dividing the region such that each grid of the plurality of grids in a driving lane of the vehicle has a different size from other grids of the plurality of grids on other lanes.

8. The method of claim 1, wherein predicting the driver intent comprises concatenating and inputting the lane feature vector, the trajectory feature vector and the driving feature vector into the driver intent prediction model.

9. The method of claim 1, wherein inputting at least one of the lane feature vector, the trajectory feature vector or the driving feature vector into the driver intent prediction model further comprises inputting traffic signal information included in the driving environment information into the driver intent prediction model.

10. The method of claim 1, wherein:

generating the lane feature vector comprises:

normalizing the lane information by removing noise from the lane information and representing the normalized lane information as a first graph; and inputting the normalized lane information into the first encoder; and generating the trajectory feature vector comprises:

normalizing the trajectory information by removing noise from the trajectory information and representing the normalized trajectory information as a second graph; and inputting the normalized trajectory information into the second encoder.

11. The method of claim 1, further comprising implementing driving safety control based upon the predicted driver intent.

12. An apparatus comprising:

one or more processors; and a non-transitory storage device storing instructions that, when executed by the one or more processors, cause the one or more processors to:

receive driving environment information comprising lane information and trajectory information of a vehicle;

receive driving information of the vehicle;

generate a lane feature vector by inputting the lane information into a first encoder implemented as a graph convolutional network;

generate a trajectory feature vector by inputting the trajectory information into a second encoder implemented as a graph convolutional network;

generate a driving feature vector by inputting the driving information into a third encoder implemented as an artificial neural network; and predict a driver intent by inputting at least one of the lane feature vector, the trajectory feature vector or the driving feature vector into a driver intent prediction model, wherein the driver intent is represented as a destination grid cell on a grid map corresponding to a drivable region of the vehicle and wherein driving safety control can be implemented based on the predicted driver intent.

13. The apparatus of claim 12, wherein the instructions further cause the one or more processors to train the driver intent prediction model by using the driver intent and the trajectory information.

14. The apparatus of claim 13, wherein the instructions further cause the one or more processors to:

generate a predicted driving route by using the driver intent;

label the trajectory information;

compare the labeled trajectory information with the predicted driving route; and change a weight of the driver intent prediction model based on a result of the comparison.

15. The apparatus of claim 12, wherein the instructions further cause the one or more processors to:

determine a size of a region for which the grid map is to be generated by using the driving information and the lane information; and generate the grid map by dividing the region into a plurality of grids.

16. The apparatus of claim 12, wherein the instructions further cause the one or more processors to:

generate normalized lane information and normalized trajectory information by representing the lane information and the trajectory information as a graph, respectively;

generate the lane feature vector by inputting the normalized lane information into the first encoder; and generate the trajectory feature vector by inputting the normalized trajectory information into the second encoder.

17. The apparatus of claim 12, wherein the instructions further cause the one or more processors to predict the driver intent by inputting the at least one of the lane feature vector, the trajectory feature vector or the driving feature vector and traffic signal information included in the driving environment information into the driver intent prediction model.

18. A method for predicting a driver intent of a driver in a vehicle, the method comprising:

receiving driving environment information comprising lane information, trajectory information, and traffic signal information;

receiving driving information of the vehicle comprising at least one of an acceleration, a yaw rate, a steering angle, or a speed;

pre-processing the lane information by removing noise and representing the lane information as a first graph comprising nodes connected by edges;

pre-processing the trajectory information by removing noise and representing the trajectory information as a second graph comprising nodes connected by edges;

pre-processing the driving information by removing noise using a low-pass filter;

generating a grid map by determining a size of a drivable region using the speed and acceleration from the driving information and a width of a driving lane from the lane information and dividing the drivable region into a plurality of grids wherein each grid in a current driving lane of the vehicle has a different size than grids in adjacent lanes;

generating a lane feature vector by inputting the pre-processed lane information into a first encoder implemented as a first graph convolutional network;

generating a trajectory feature vector by inputting the pre-processed trajectory information into a second encoder implemented as a second graph convolutional network;

generating a driving feature vector by inputting the pre-processed driving information into a third encoder implemented as an artificial neural network;

concatenating the lane feature vector, the trajectory feature vector, and the driving feature vector to form a combined feature vector;

predicting the driver intent by inputting the combined feature vector and the traffic signal information into a driver intent prediction model implemented as a deep neural network, wherein the predicted driver intent is represented as a destination grid cell on the grid map; and implementing driving safety control based upon the predicted driver intent.

19. The method of claim 18, wherein the trajectory information comprises only trajectory data within a predetermined distance from a current location of the vehicle.

20. The method of claim 18, wherein dividing the drivable region into the plurality of grids comprises making a size of each grid in the current driving lane 0.5 times a size of each grid in the adjacent lanes.

* * * * *